Figure 1:
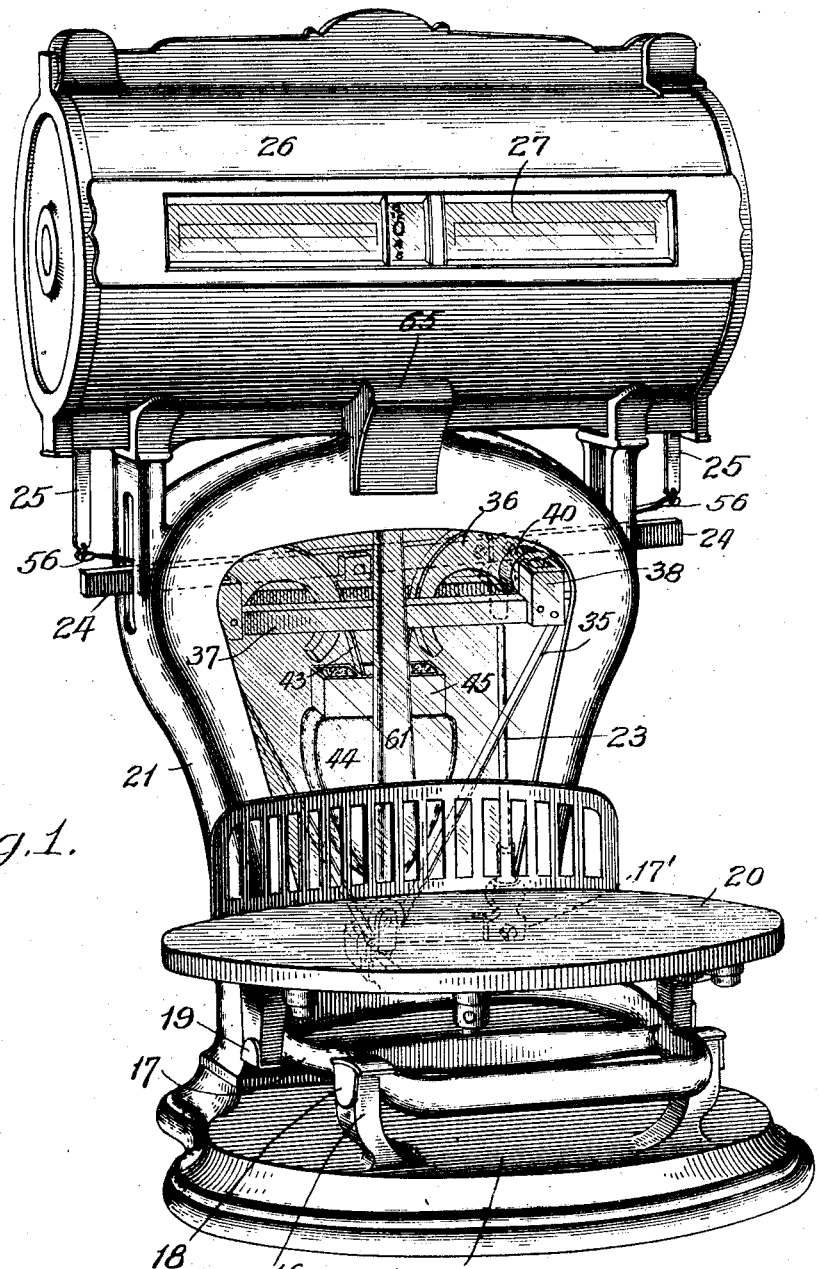

G. M. LUDLOW.
AUTOMATIC WEIGHING SCALE.
APPLICATION FILED MAY 19, 1913.
1,140,836.
Patented May 25, 1915.
5 SHEETS—SHEET 2.
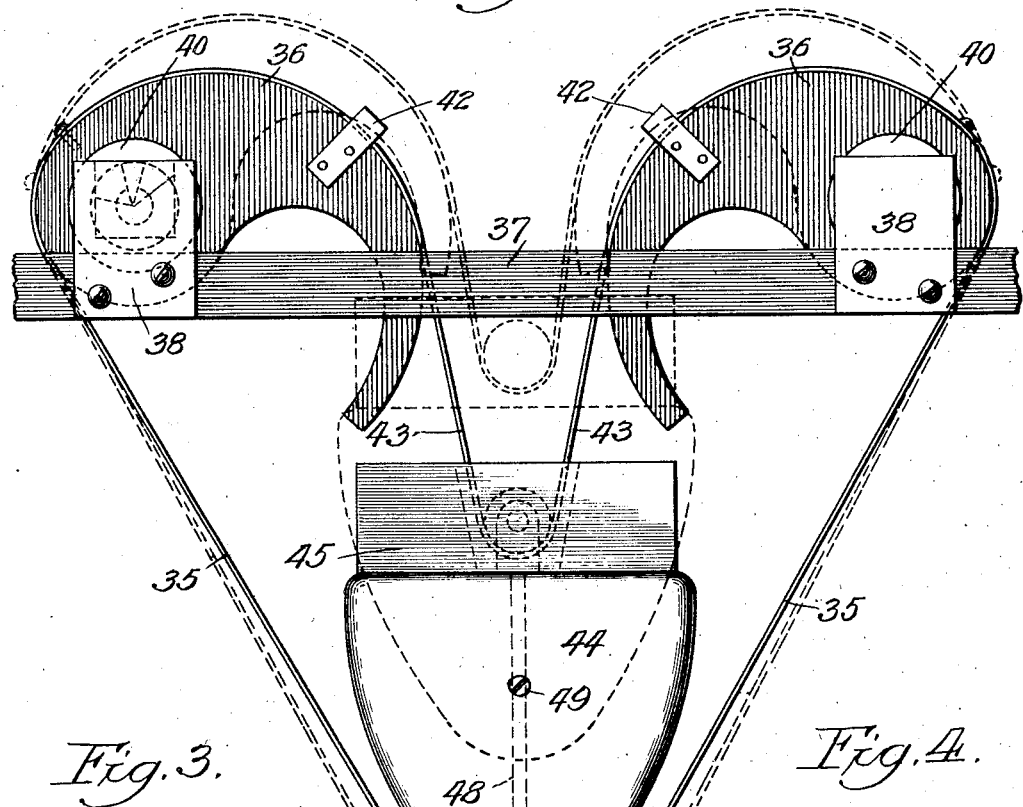
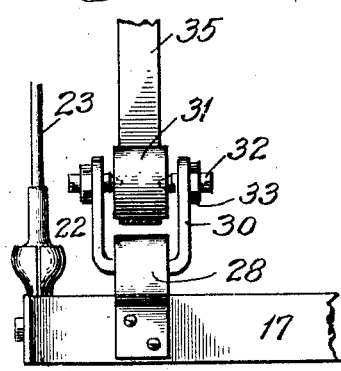
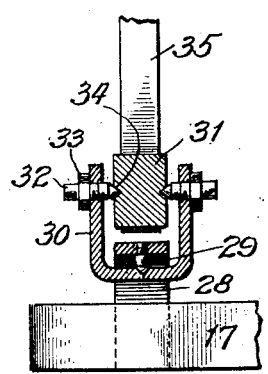
Witnesses:
John Enders
Henry A. Parks
Inventor:
George M. Ludlow,
by Sheridan, Wilkinson, Scott & Richmond
Attys.

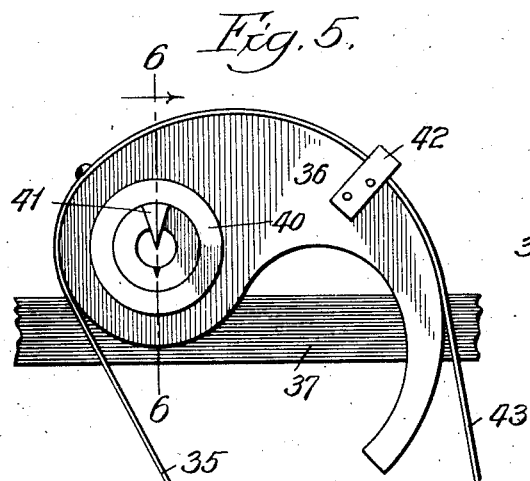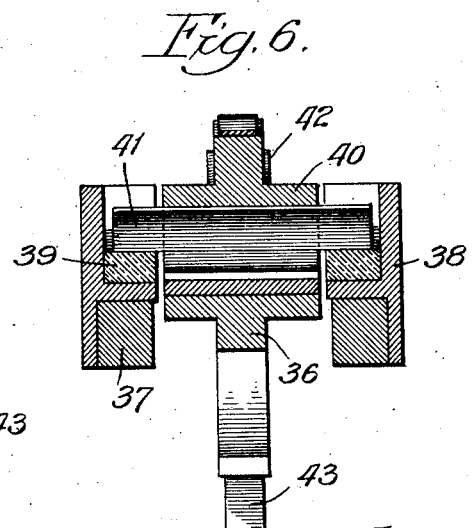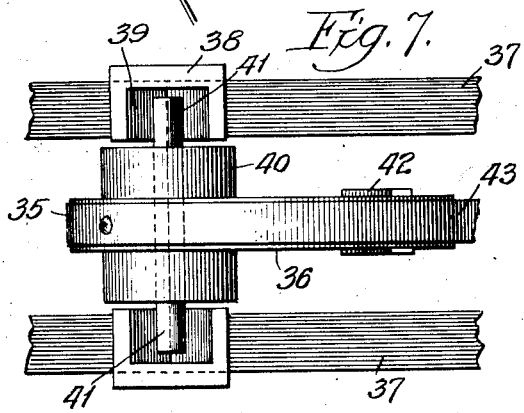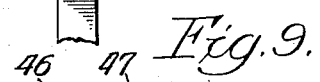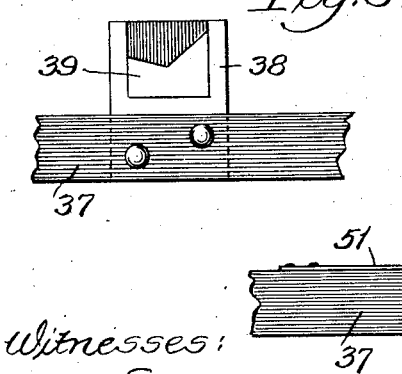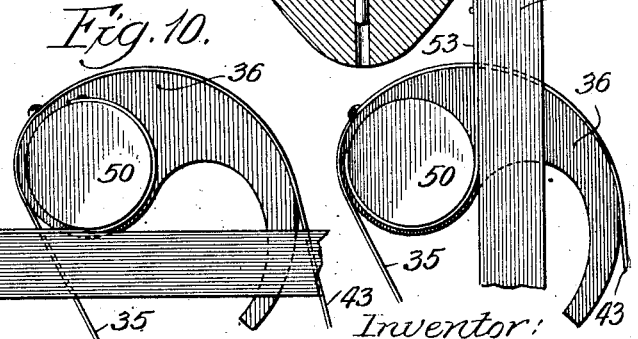

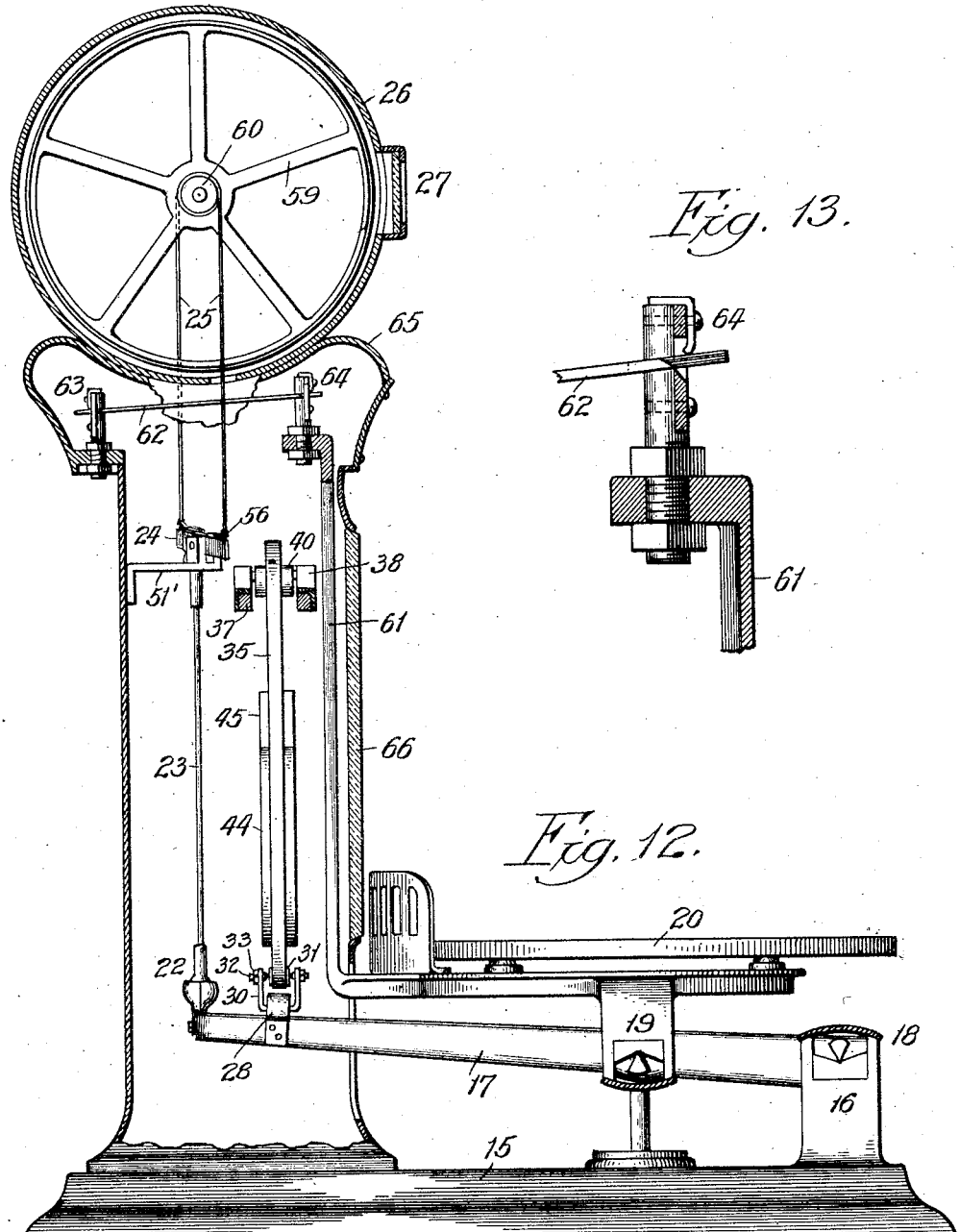

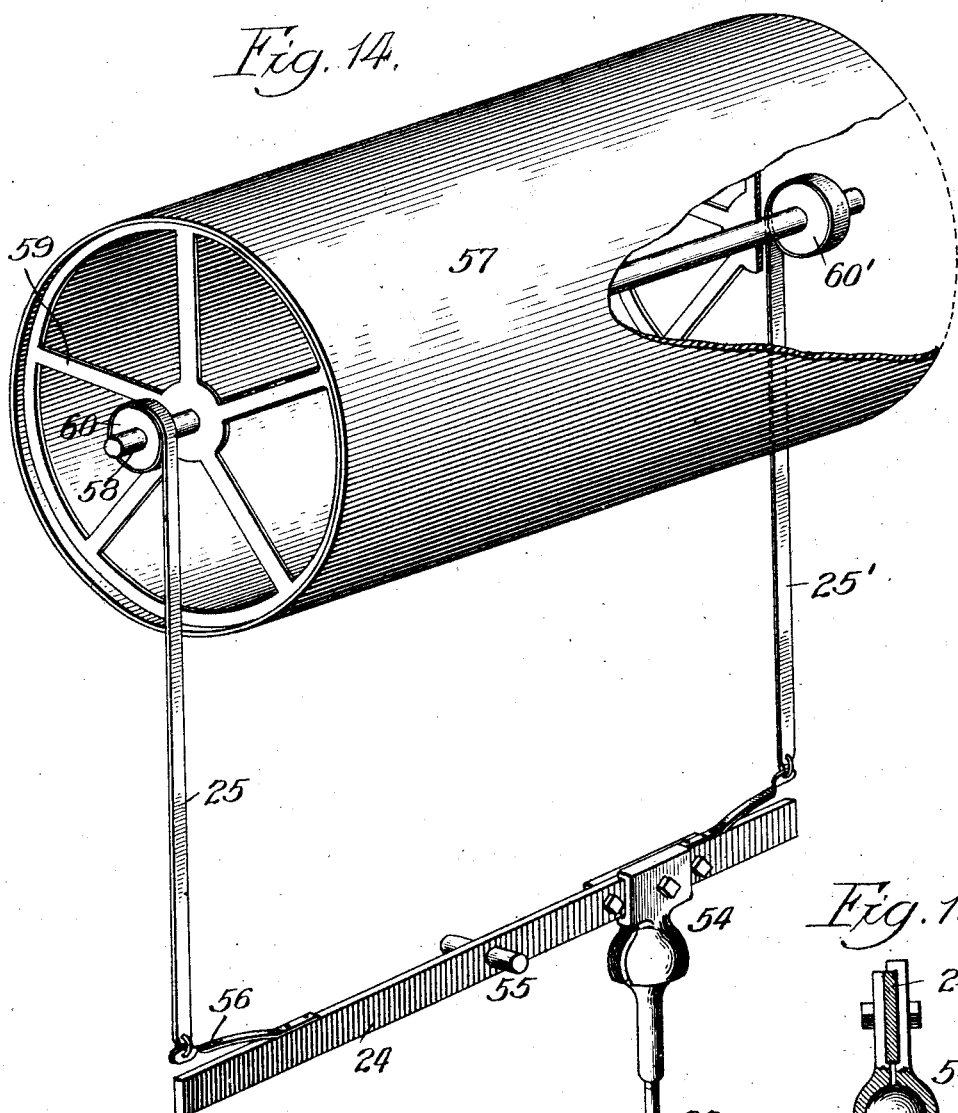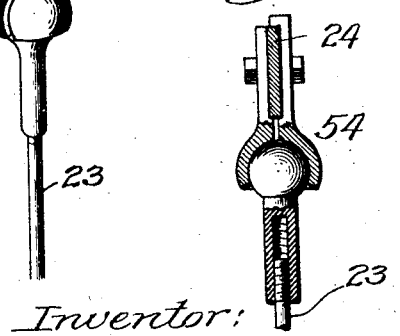

UNITED STATES PATENT OFFICE.

GEORGE M. LUDLOW, OF CHICAGO, ILLINOIS, ASSIGNOR TO THE COMPUTING SCALE COMPANY, A CORPORATION OF OHIO.

AUTOMATIC WEIGHING-SCALE.

1,140,836. Specification of Letters Patent. Patented May 25, 1915.

Application filed May 19, 1913. Serial No. 768,610.

*To all whom it may concern:*

Be it known that I, GEORGE M. LUDLOW, a citizen of the United States, residing at Chicago, in the county of Cook and State of Illinois, have invented certain new and useful Improvements in Automatic Weighing-Scales, of which the following is a specification.

The principal object of my invention is to provide a new and improved automatic scale in which the goods to be weighed shall be counterbalanced by a weight.

Another object of my invention is to provide an automatic scale for weighing goods in which a counterbalancing weight is employed connected to the scale platform by symmetrically disposed cams and flexible members.

Another object of my invention is to provide an automatic weighing scale that will not become inaccurate when slightly displaced from its normal level position.

Another object of my invention is to provide improved transmitting mechanism for actuating a drum chart in connection with an automatic computing scale.

Still another object of my invention is to provide transmitting mechanism for a drum chart comprising tapes wound oppositely about the chart shaft.

These and other objects of my invention will be apparent in connection with the accompanying specification and drawings, taken with the appended claims.

For the purpose of illustrating my invention and explaining the principle thereof, I have shown a specific embodiment in the accompanying drawings, together with a few modifications of detail, but it will be understood that the invention is defined in the appended claims.

Referring to the drawings—Figure 1 is a general perspective view of an automatic scale embodying my invention. Fig. 2 is a front elevation of the counterpoise and the means connecting the same to the end of the scale lever. Fig. 3 is a side elevation of the end of the scale lever and associated structural elements. Fig. 4 is a vertical section corresponding to the elevation shown in Fig. 3. Fig. 5 is an elevation of one of the cams. Fig. 6 is a vertical section thereof taken on the line 6 of Fig. 5 looking in the direction of the arrows. Fig. 7 is a top plan view of the cam and associated parts which appear in elevation in Fig. 5. Fig. 8 is an inside elevation of one of the knife edge supports which appear in top plan view in Fig. 7. Fig. 9 is a vertical section of the counterpoise. Figs. 10 and 11 illustrate modified cam supporting structures. Fig. 12 is a vertical median section of the entire apparatus. Fig. 13 is an enlarged sectional detail of the same. Fig. 14 is a perspective view of the transmitting mechanism for the drum chart. Fig. 15 is a top plan view of a detail shown in perspective in Fig. 14. Fig. 16 is a vertical section of the same detail.

The scale illustrated in the drawings is of the type generally known as automatic; this means that the whole manual operation of weighing consists merely in placing the goods to be weighed upon the platform or goods receiver. In other words, no manual adjustment of the counterpoise is necessary.

The scale shown in Fig. 1 has a base 15 to stand upon the counter and this base carries standards 16 which support the scale lever 17 on knife edge bearings at 18. The platform 20 rests upon the lever 17 with knife edge bearings at 19. The base 15 carries two standards 21 between which is an inclosed space with a pane of glass 66 at the front; thus forming a housing for certain mechanism presently to be described. The extreme end of the scale lever 17 is offset to one side as designated 17' in Fig. 1. This offset end 17' engages the lower end of the vertical link 23 by a universal joint 22. The upper end of this link 23 engages the lever 24 by a universal joint 54. The lever 24 is supported at its middle point 55 on roller bearings. The ends of the lever 24 are connected through short tension springs 56 to the lower ends of the tapes 25 and 25'. The standards 21 carry a drum casing 26 within which is the drum chart 57. This drum chart 57 is mounted on the spiders 59 carried on the shaft 58. The ends of the shaft 58 are supported in roller bearings not shown in the drawings. Within the ends of the shaft 58 it carries two pulleys 60 and 60', about which the tapes 25 and 25' are wrapped in opposite directions, as shown in Fig. 14. The casing 26 has a sight opening 27 through which the readings on the drum chart 57 may be viewed. These readings not only indicate the weight of the goods on the platform 20, but also their total cost at various prices per unit of weight within the range of the device.

Rigidly connected with the platform 20, is the upright 61. The link 62 has one end pivoted on the fixed support 63 and its other end pivoted at 64 to the upper end of the arm 61.

65 is a housing for the mechanism that has just been described. This mechanism maintains the platform 20 approximately horizontal for all normal conditions of the scale.

The end of the scale lever 17 carries a yoke 28 with a depending stud 29 shown in Fig. 4. A stirrup 30 has a conical depression that engages the stud 29 and the arms of this stirrup 30 carry a roller 31 between them supported by adjustable cone bearings with the screw cones 32 engaging the conical depressions 34 in the roller 31. The screws 32 are held in place by the lock-nuts 33. Under the roller 31 passes the flexible steel tape 35 with its ends secured by screws to the respective cams 36. Each cam 36 has a hub 40 carrying the knife edges 41, which rest in agate bearings 39 supported by the brackets 38 mounted on the cross bars 37. Each cam 36 has guide lugs 42 between which passes the flexible steel tape 43. This tape 43 has its ends secured by screws to the cams 36 and passes under the roller 46, thus supporting the counterweight 44. This counterweight 44 is a lead mass having a space 45 that may have lead shot placed therein for adjustment. The roller 46 is pivotally mounted between the jaws 47 of a yoke which is attached by means of the stem 48 and the pin 49.

It will be seen that the platform 20 and the goods thereon exert a downward pressure on the lever 17 between its fulcrum 18 and its end; this causes a downward tension on the tape 35. The counterpoise 44 also pulls downwardly on each side of the tape 43. The two tapes 35 and 43 pull obliquely down on each cam 36 on each side of its knife edge bearings 41, and thus the cam is kept in equilibrium. When a weight is added on the platform 20, increased tension on the tape 35 rotates the cams up, increasing the moment arm for the pull on the branches of the tape 43 until a new position of equilibrium is attained. As increasing weight on the platform 20 depresses the lever 17, the link 23 is pulled down, thus causing the tape 25' to unwind from the pulley 60' and the tape 25 to wind upon the pulley 60. In this way the drum chart 57 is caused to rotate in accordance with the movement of the lever 17. The tension springs 56 will keep the tapes 25 and 25' taut and will also permit the drum 57 to lag momentarily, if need be, on account of its inertia, behind the movement of the lever 24.

It will readily be understood that the proper contour can be given to the cams 36 so that the graduations on the drum within the casing 26 will be uniform. Or, for any given contour of the cams 36, within limits, the graduations on the drum within the casing 26 can be adjusted so as to give correct readings of weights and total costs.

Instead of having knife edge bearings for the cams 36, as shown in Fig. 2, I may provide each cam with a roller 50 on each side and let these rollers 50 rest upon the frame members 37. In this case the two extra tapes 51 for each cam are provided as shown in Fig. 10 so as to constrain the rollers 50 to roll on the bars 37 instead of sliding thereon. As shown in Fig. 11, vertical frame members 52 may be provided and the rollers 50 may be hung on the tapes 53. In this case the pull on the tapes 35 and 43 being obliquely down and to the right, the rollers 50 are held against the bars 52.

If the scale shown in Fig. 1 is tilted slightly to the right or left, the rollers 31 and 46 will permit readjustment of the parts and thus there is a compensating effect so that, within limits, a slight deviation from level position of the scale does not disturb the substantial accuracy of its readings.

It will be observed that the counterweight 44 is supported by the two diverging branches of the tape 43; thus the counterweight 44 is prevented from swaying laterally as it would do if supported by only a single vertical tape.

I claim:

1. In a scale for weighing goods, a platform, a counterweight, and connecting mechanism from the platform to the counterweight comprising a scale lever and symmetrically disposed flexible elements from the end thereof.

2. In a scale for weighing goods, a platform, a counterweight, and connecting mechanism from the platform to the counterweight comprising a scale lever and flexible elements extending divergently from the counterweight and from the lever.

3. In a scale for weighing goods, a platform, a lever, a counterweight in vertical alinement with the end of the lever, two cams, one on each side of the counterweight, and flexible elements connecting the end of the lever and the counterweight to the said cams.

4. In a scale for weighing goods, a lever, a platform carried on the lever, a counterweight above the end of the lever, two cams, one on each side of the counterweight, flexible tapes connecting the end of the lever to the cams and also connecting the counterweight to the cams and equalizers at the end of the lever and at the counterweight.

5. In a scale for weighing goods, a platform, a lever, a counterweight in vertical alinement with the end of the lever, two cams, one on each side of the counterweight, a roller carried by the counterweight, another roller carried by the end of the lever, and two flexible tapes each having its ends connected to a respective cam, one tape passing under the roller on the end of the lever and the other tape passing under the roller on the counterweight.

6. In a scale for weighing goods, a horizontal lever, a platform carried thereby, a framework above the end of the lever, two opposed cams supported on said framework, flexible tape connections from the end of the lever to the said cams, a counterweight between the cams and flexible tape connections to support said counterweight from said cams.

7. In a scale for weighing goods, a platform, a lever, a counterweight in vertical alinement with the end of the lever, two cams, one on each side of the counterweight, flexible elements connecting the end of the lever and the counterweight to the said cams, and equalizing means for said flexible elements located at the end of the lever and upon the counterweight.

8. In a scale for weighing goods, a lever, a platform thereon, a counterweight, connecting mechanism from the lever to the counterweight comprising symmetrically disposed cams and flexible elements and also comprising equalizing means at the lever and at the counterweight to accommodate lateral tilting of the scale, said flexible elements engaging said lever and counterweight through said equalizing means.

9. In a scale for weighing goods, a lever, a platform thereon, a counterweight, and connecting mechanism from the lever to the counterweight comprising a plurality of flexible members extending divergently upward from the lever and from the counterweight, said flexible members having their upper and outer portions operatively connected.

10. In a scale for weighing goods, a horizontal lever, a platform carried thereby, a framework above the end of the lever, symmetrically disposed cams carried by said framework, a counterweight above the end of the lever between the cams, flexible connections from the end of the lever to the cams and from the counterweight to the cams, a computation chart above the cams, and mechanism extending from the end of the lever to the said chart to actuate the same in correspondence with the movement of the scale lever.

11. In a scale for weighing goods, a platform, a lever, a counterweight in vertical alinement with the end of the lever, two cams, one on each side of the counterweight, flexible elements connecting the end of the lever and the counterweight to the said cams, a computation chart, and mechanism connecting the lever to the chart adapted to give the chart a displacement proportional to the movement of the lever, the contour of the cams being adapted to give equilibrium positions for uniform displacements of the lever and uniform increments of weight upon the platform.

12. In a scale for weighing goods, a drum chart, an axial shaft supporting the same, pulleys fixed on said shaft near its ends, tapes wound in opposite directions on said pulleys, and transmitting mechanism from the goods receiver of the scale to wind and unwind said tapes in opposite directions and thereby rotate the drum chart.

13. In a scale for weighing goods, a cylindrical drum chart, a horizontal axial shaft supporting the same, pulleys fixed on said shaft near its ends, tapes wound on said pulleys in opposite directions and depending therefrom, an approximately horizontal lever with its ends connected to the lower ends of the said tapes and having a fixed fulcrum at its middle point, and scale mechanism connected to said lever at one side of its fulcrum.

14. In a scale for weighing goods, a cylindrical drum chart, a horizontal axial shaft supporting the same, pulleys fixed on said shaft near its ends, tapes wound on said pulleys in opposite directions and depending therefrom, tension springs connected to the lower ends of said tapes, an approximately horizontal lever with its ends connected to said tension springs, a fixed fulcrum for said lever at its middle point, and scale mechanism connected to the lever at a point on one side of its fulcrum.

15. In a scale for weighing goods, a cylindrical drum chart, an axial shaft for the same, two pulleys on said shaft, tapes wound on said pulleys in opposite directions, and scale mechanism connected to the ends of said tapes, said scale mechanism being adapted to simultaneously pull on one tape and yield on the other and thereby rotate the drum chart.

16. In a scale for weighing goods, a portable base frame, a pair of opposed cams rotatably mounted thereon, flexible elements attached to the cams and adapted to wind thereon, gravity members to be balanced against each other, said flexible elements being attached to one of said members and diverging upwardly therefrom to the said cams, and equalizing means at the point of attachment of said flexible elements to said member to accommodate lateral tilting of the scale.

In testimony whereof, I have subscribed my name.

GEORGE M. LUDLOW.

Witnesses:
 WALTER A. SCOTT,
 THOMAS F. SHERIDAN.